United States Patent [19]

Folson

[11] 4,377,883
[45] Mar. 29, 1983

[54] TWIN CASTER ASSEMBLY

[75] Inventor: Henry J. Folson, Redondo Beach, Calif.

[73] Assignee: Plastiglide Manufacturing Corporation, Hawthorne, Calif.

[21] Appl. No.: 310,497

[22] Filed: Oct. 13, 1981

[51] Int. Cl.³ .................. A47B 91/00; B60B 33/00
[52] U.S. Cl. .......................................... 16/47; 16/45; 16/38
[58] Field of Search .................. 16/47, 45, 48 A, 38, 16/37

[56] References Cited

U.S. PATENT DOCUMENTS

| | | | |
|---|---|---|---|
| 3,641,621 | 2/1972 | Closa | 16/45 |
| 3,713,186 | 1/1973 | Cartwright | 16/45 |
| 3,822,437 | 7/1974 | Screen | 16/45 |
| 4,067,083 | 1/1978 | Screen | 16/45 |
| 4,077,088 | 3/1978 | Malara | 16/47 |
| 4,120,071 | 10/1978 | Cresenzi | 16/37 |

Primary Examiner—Doris L. Troutman
Attorney, Agent, or Firm—Charles H. Schwartz; Ellsworth R. Roston

[57] ABSTRACT

A twin caster assembly, including a shaft member having a center portion and opposite end portions, a body member including an axial opening for receiving and supporting the center portion of the shaft member and with the end portions extending on opposite sides of the body member, a pair of wheels each having a central axial hub including an axial opening for receiving one end portion of the shaft member and the end portions of the shaft member and the axial opening of the wheels including a plurality of mating grooves and ridges each having sloping sides to lock the wheels on the opposite end portions of the shaft member and with the mating grooves and ridges having sufficient clearance for allowing rotation of the wheels on the end portions of the shaft member and with the number of mating grooves and ridges in the range between three (3) and eight (8).

13 Claims, 4 Drawing Figures

TWIN CASTER ASSEMBLY

BACKGROUND OF THE INVENTION

1. Field of the Invention

The present invention relates to a caster assembly and, more specifically, to a twin-wheel caster having a pair of wheels mounted for rotation on opposite ends of a common shaft and with the shaft supported by a body member.

2. Description of the Prior Art

In the prior art, twin-wheel casters have been constructed wherein a shaft member is supported by a body member and with wheels mounted for rotation on opposite ends of the shaft member. Generally, in the prior art, the shaft or axle includes a narrow groove which receives a ridge which is molded in an axial opening in a hub portion of a plastic wheel. The difficulty with this design is that with use of the caster the cyclical axial loadings applied to the wheel soon wear away the plastic ridge due to the sharp corners of the groove formed on the axle.

In one prior art attempt to eliminate the above problem, a wide groove at the end of the axle is used which groove approaches one-half of the depth of the axial opening in the wheel. The groove is positioned so that the axle ends in a knife-edged disc. The disc snaps over the ridge formed in the axial opening of an under-cut plastic wheel and, because of the unbalanced support provided by this design, the axle tends to wear into the wheel. This in turn effectively increases the under-cut portion adjacent the ridge thereby improving the retention of the wheel on the axle. The problem with this type of approach is that as the wheels wear in, the wheels tend to become wobbly.

Other prior art casters have included two grooves at the end of each axle, but these two grooves had sharp corners which would tend to wear away the under-cut portion of the plastic wheel adjacent to the ridges.

SUMMARY OF THE INVENTION

The caster assembly of the present invention includes wheels mounted on opposite ends of an axle or shaft and with each end portion of the shaft including a plurality of at least three mating grooves and ridges on the axle and the wheel so as to support the wheels for rotation around the axle. The grooves and ridges have sloping sides and with the angle of the sloping sides in the range between 20° to 60°. The ridges and grooves are continuous along a substantial length of the axle and the inner axial bearing surface of the wheel. As indicated above, the number of the ridges and grooves would be at least three (3) and more specifically the number would be in the range between three (3) to eight (8) ridges and grooves. The preferred number of mating ridges and grooves are four (4) or five (5).

The present invention generally uses the number of ridges and grooves in the range of three (3) to eight (8) since if there were less than three (3) mating ridges and grooves then each ridge and groove would have to be relatively high so as to supply sufficient surface area to resist the wheel from being pulled off during use. If the ridges and grooves are high, then this tends to wear off the plastic ridge as with the prior art devices. On the other hand, if there are too many mating ridges and grooves, such as more than eight (8), then, because of manufacturing tolerances, the ridges and grooves would resemble no more than just a roughened surface and would not provide sufficient holding of the wheel on the axle during use.

In a specific embodiment of the invention, the ridges and grooves are asymmetric on the opposite sloping sides so as to compensate for distortion of the plastic during demolding and during the insertion of the end of the axle within the plastic wheel during assembly. In particular, the the direction of asymmetry is such that when the wheel is assembled on the shaft, there is a sufficient clearance to prevent binding of the wheel on the shaft even if there was distortion of the plastic during the demolding and assembling operations. The wheels of the present invention therefore roll freely on the shaft and as the wheels wear in, a high degree of surface area is produced at the interface between the groove and ridges. Casters constructed in accordance with the teachings of the present invention have a greater life and can withstand more rotations of the wheel on the shaft under axial load than prior art devices.

The caster of the present invention, therefore, has very high pull-off forces because of the multiple mating grooves and ridges and yet the caster is easy to manufacture using low-cost parts and with simple assembly. When vertical load is applied to the caster, this load forces the mating grooves and ridges together to further resist axial pull-off. On the other hand, wear of the wheel on the axle is at a minimum because of the largest possible bearing area. When wear does occur, the mating groove and ridge contours between the groove and ridges is still maintained, thereby helping retention of the wheel on the axle.

BRIEF DESCRIPTION OF THE DRAWINGS

A clearer understanding of the present invention may be had with reference to the following description and drawings wherein

As shown in FIG. 1, a twin caster assembly constructed in accordance with the teachings of the present invention may be formed using a body member 10 including integral flanges 20 and 22 to receive and enclose a pair of plastic caster wheels 12 and 14. The body member 10 may include an integrally formed boss 16 and with an opening 18 in the boss to receive a stem 19 for supporting the caster in a desired location.

FIG. 2 illustrates an exploded view of the twin caster of FIG. 1 showing the body member 10 and the caster wheels 12 and 14. As can be seen more clearly in FIG. 2, the body portion 10 includes the integral flange portions 20 and 22 to receive and enclose the wheels 12 and 14. The body portion 10 also includes an integrally formed hub portion 24 and with an opening 26 through the hub portion 24 to receive and support a metal shaft member 28. In particular, the shaft member 38 includes a central knurled section 30 which is frictionally received within the opening 26 in the hub portion 24. The shaft member 28 also includes end portions 32 and 34, each of which has a plurality of grooves 33 and 35.

Figure 1:
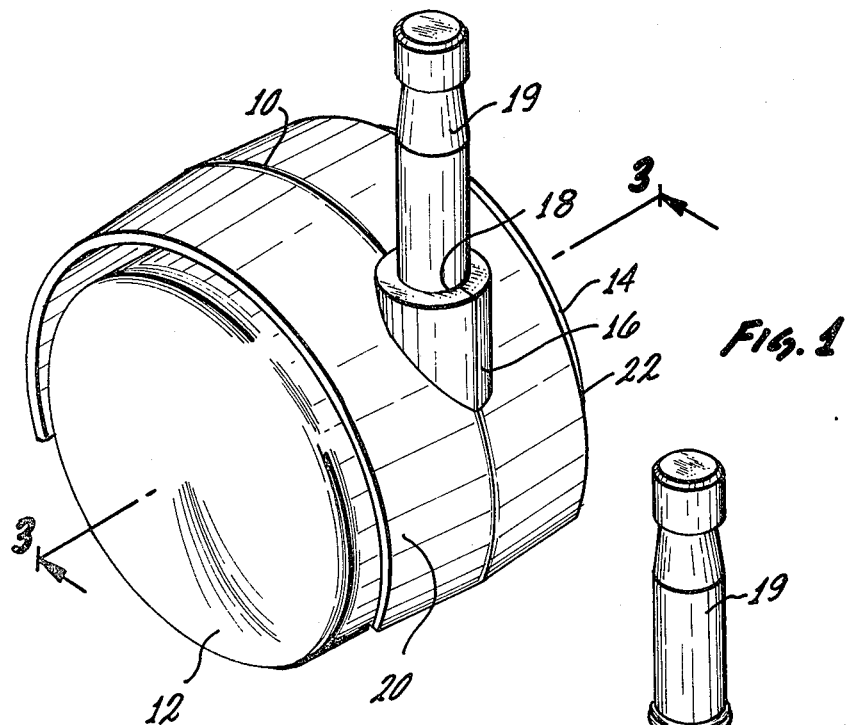
FIG. 1 is a perspective view of the outside configuration of a twin caster of the present invention.

Each of the wheel members 12 and 14 includes a hub portion and, in particular, wheel member 12 has a hub portion 36 and wheel member 14 has a hub portion 38. Each hub portion includes a blind axial opening, such as opening 40 in hub portion 36 and opening 42 in hub portion 38. The openings 40 and 42 include a plurality of ridges 44 and 46 complimentary in configuration and number to the mating grooves 33 and 35 of the end portions 32 and 34 of the shaft 28.

Figure 2:
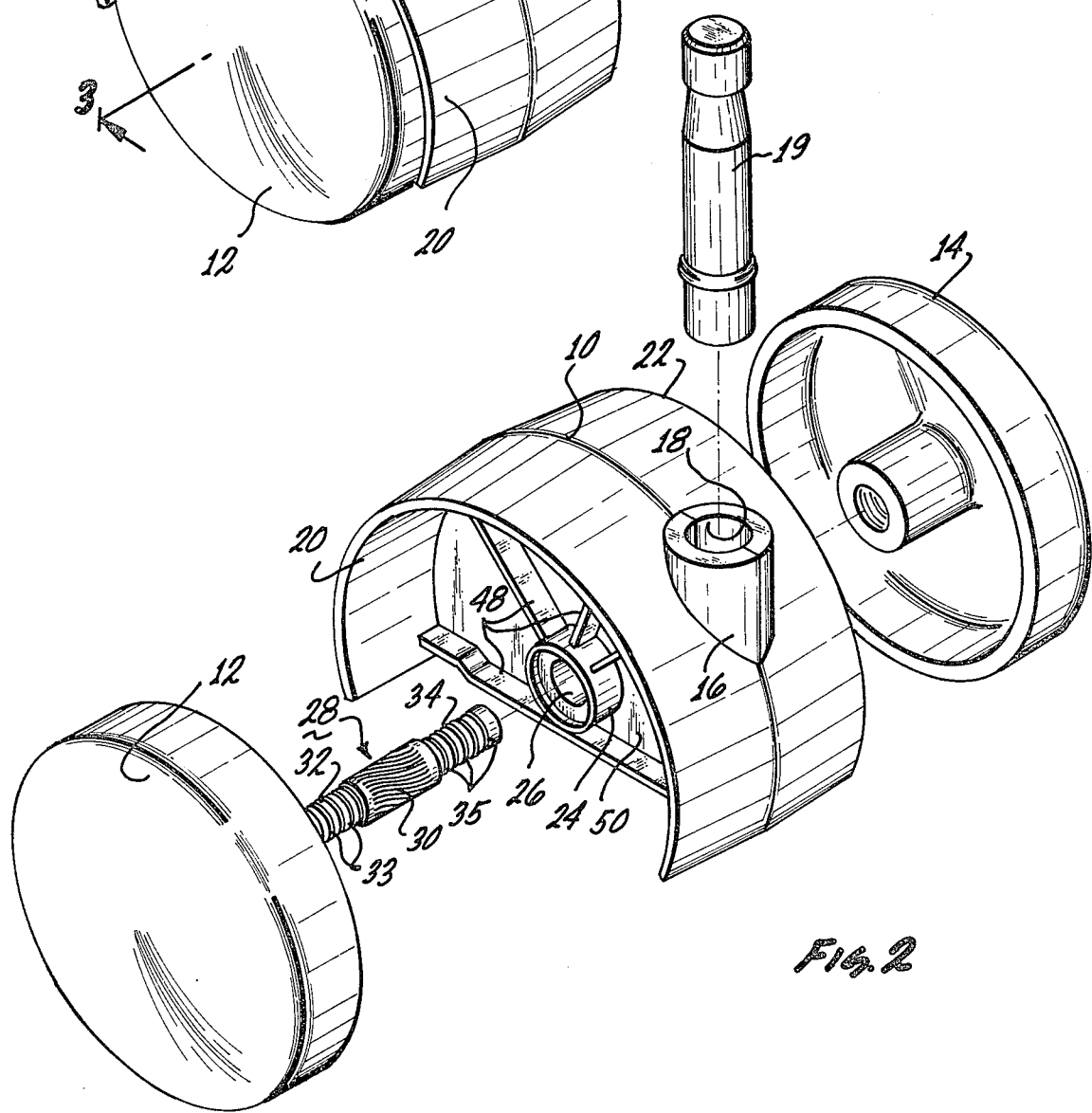
FIG. 2 is an exploded perspective view of the caster of FIG. 1.
Figure 3:
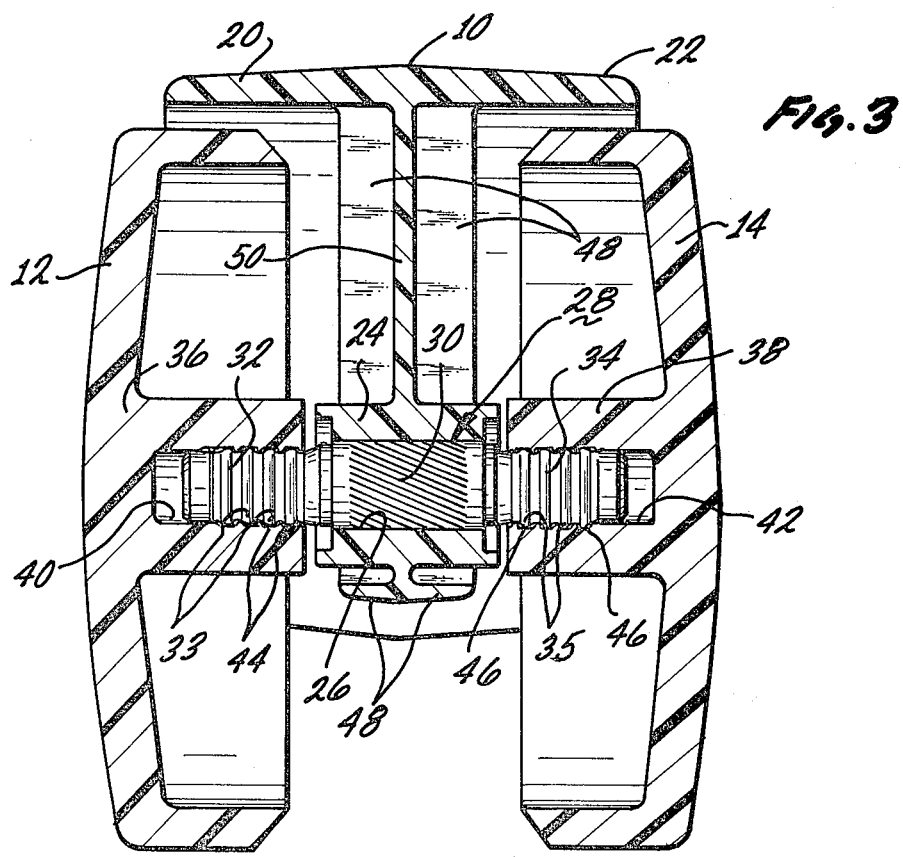
FIG. 3 is a cross-sectional view of the caster of FIG. 1 taken along lines 3—3 of FIG. 1.

As can be seen in FIG. 2, the body member 10 also includes a plurality of ribs 48 which extend on both sides of a central web 50 to provide additional rigidity in the body structure and for supporting the hub portion 24 and the flange portions 20 and 22.

Figure 4:
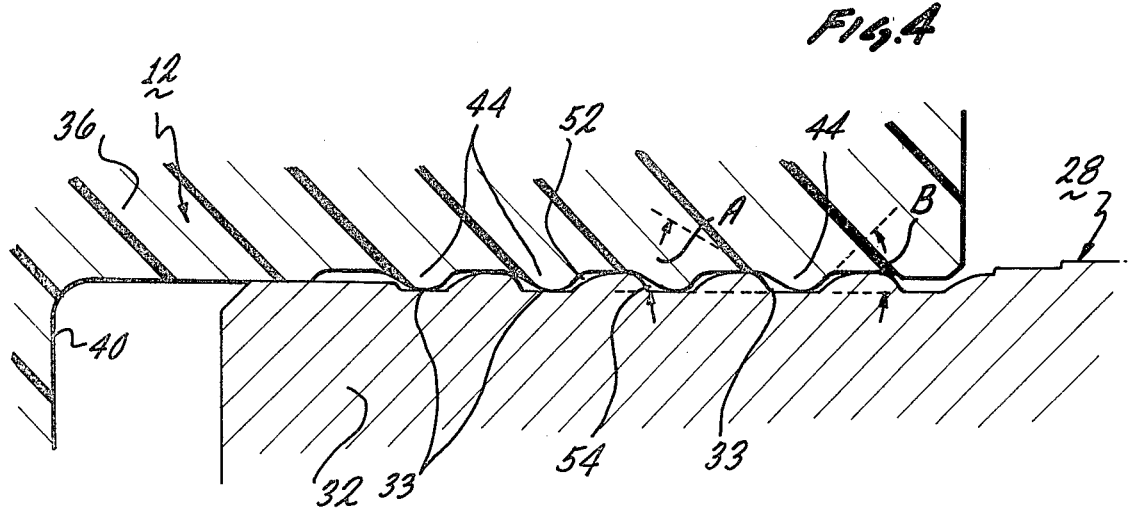
FIG. 4 is a detail view of the interface between the grooves and ridges showing the asymmetric configuration.

As can be seen in FIG. 4, which shows the interface between the ridges and grooves of the one wheel 12 mating with the end 32 of the shaft 28, the plurality of ridges and grooves have mating surfaces which may be asymmetric in contour. Four mating ridges and grooves are shown and the present invention contemplates a plurality of at least three (3) but no more than eight (8) such mating ridges and grooves. The preferred number of ridges and grooves would be four (4) or five (5). The sloping sides of the ridges and grooves generally run between 20°–60° and as shown in FIG. 4, one side would be closer to the 20° angle and the other side would be closer to the 60° angle. In general, the angles and depths for the sloping sides of the ridges and grooves provide for an optimum result in accordance with the following interrelated factors:

First, the angles are not too great nor the depth too great, so as to allow for an economic molding of the wheel wherein the wheel may be snapped off the core of a simple tool with a minimum distortion. Also, the axle portion may be economically and accurately machined or rolled to the dimensions, if the angles are not too great nor the depth too great. However, the angles are steep enough so that the system is insensitive to normal production tolerances and so that there is adequate interference between the ridges and grooves to maintain the wheel locked onto the shaft even after a large number of rotations of the wheel on the shaft under load.

The angle is shallow enough so that the assembly snaps together without destroying the plastic ridges. In addition, the angles are shallow enough so that under load the plastic wheel bears effectively on a large area of the metal axle so as to lower the bearing stress at any one point and therefore keep the wear low. However, the angles are steep enough so that the parts will wear in together and keep renewing the contour configuration between the parts. Finally, the angles are steep enough and there are enough grooves and ridges so that the wheel and axle do not tend to wedge together which could create a lockup of the wheel on the axle under axial load.

In addition to the above, the ridges and grooves may be formed with the asymmetric contour shown in FIG. 4. This asymmetrical contour provides for an additional advantage during the demolding of the wheel and during the assembly of the wheel on the axle. In particular, as can be seen in FIG. 4, there are essentially two areas of clearance formed which areas are designated 52 and 54. The area 52 allows for clearance even if during demolding the plastic ridges are distorted by the molding tool. The slope of one side of the groove 33 in the axle in the area 52 is flatter so that if during demolding plastic material is flowed on the one side of the ridge 44 adjacent the area 52, the clearance would still be sufficient to prevent binding between the parts.

The clearance area 54 provides for clearance between other sloping sides of the grooves and ridges of the axle and the wheel and compensates for any distortion of the plastic material which may occur when the axle is inserted into the wheel. As can be seen, this insertion of the end 32 of the axle 28 toward the other side of the ridges 44 can force the plastic of the ridges 44 to be distorted. The area 54 allows for clearance on the other sides of the grooves and ridges and prevents any binding of the plastic wheel on the metal axle.

In the particular embodiment shown in FIG. 4, the asymmetric configuration for the grooves and ridges are complementary and are the same but reversed. In general the groove and ridges have one side of a shallower slope and one side of a greater slope. As indicated above, the shallower slope may range between 20°–40° and in a specific embodiment the shallower slope has a value of approximately 30° as formed by a tangent to the sloping side and relative to the center axis of the rotating wheel. This may be seen by the angle A shown in FIG. 4. On the steeper slope, the angle may range between 30°–60° and in a specific embodiment the slope has a value of approximately 45° as formed by a tangent to the sloping side and relative to the center axis of the rotating wheel. This may be seen by the angle B shown in FIG. 4. It will also be appreciated that as the wheel tends to wear into the axle, the plastic ridge will eventually conform to the configuration of the axle so that the surfaces become fully mating to each other. However, the use of the asymmetric configuration compensates for any manfacturing tolerances and for any distortions caused by demolding the wheel from the molding tool and distortions caused when the wheel is inserted onto the axle.

After the wheel is inserted onto the axle during the assembly of the caster, the initial configuration is generally as shown in FIG. 4 with the areas 52 and 54 providing for clearance so that there is a substantially small area of contact between the grooves and ridges. This initial small area of contact allows for the wheels to be relatively freely moving on the axles, even if the parts initially provide for an actual interference fit. Since the area contact is fairly small, a relatively small number of rotations of the wheels allows for a substantial freedom of rotation between the wheel and the axle. Further rotation allows for the parts to wear in properly and provide for a smooth rotation of the wheel on the axle with a long life for this rotation without the wheels binding or wobbling.

Generally, the caster design of the present invention, wherein the wheels and the axles have the particular multiple groove configuration described in the present invention, produce the following desirable characteristics. The wheels resist pulling off of the axle because of the substantially high pull-off forces due to the multiple grooves. Also, as most conditions encountered that could overcome the pull-off force are momentary, the wheel will shift over only one groove and be retained and functional, although the pull-off force will now be reduced. The vertical load on the caster tends to force the mating grooves together so as to resist any axial pull-off. After the wheels wear in, wear is at a minimum because of the very large bearing area between the grooves and the ridges. When the wear does occur, the mating groove contour is still maintained thereby sustaining the excellent retention of the wheel on the axle.

Finally, the total design of the caster has excellent manufacturability because of the generally low cost of the parts and a simple assembly of these parts.

Although the present invention has been described with reference to a particular embodiment, it should be apparent that various adaptations and modifications may be made and the invention is only to be limited by the appended claims.

I claim:

1. A twin caster assembly, including
   a shaft member having a center portion and opposite end portions,
   a body member including an axial opening for receiving and supporting the center portion of the shaft member and with the end portions extending on opposite sides of the body member,
   a pair of wheels each having a central axial hub including an axial opening for receiving one end portion of the shaft member and
   the end portions of the shaft member and the axial opening of the wheels including a plurality of mating grooves and ridges each having sloping sides to lock the wheels on the opposite end portions of the shaft member and with the mating grooves and ridges having sufficient clearance for allowing rotation of the wheels on the end portions of the shaft member and with the number of mating grooves and ridges in the range between three (3) and eight (8).

2. The twin caster assembly of claim 1 wherein the number of grooves and ridges is four (4) or five (5).

3. The twin caster assembly of claim 1 wherein a tangent to the sloping sides has an angular relationship with the center axis of the shaft and wheels in the range between 20° to 60°.

4. The twin caster assembly of claim 1 wherein the sloping sides of the grooves and ridges have complementary asymmetric contours for providing clearance to compensate for manufacturing tolerances and demolding and assembly distortion.

5. The twin caster assembly of claim 4 wherein tangents to the sloping sides have angular relationships with the center axis of the shaft and wheels and with the angular relationship of one sloping side in the range of 20° to 40° and the angular relationship of the other sloping side in the range of 30° to 60°.

6. The twin caster assembly of claim 5 wherein the angular relationship of the one sloping side is approximately 30° and the angular relationship of the other sloping side is approximately 45°.

7. The twin caster assembly of claim 1 wherein
   the wheels are cup shaped and wherein the body member includes flange portions to partially enclose the cup shaped wheels and wherein the body member includes an offset boss to receive a mounting stem.

8. The twin caster assembly of claim 7 wherein
   the body member is formed with rib members radiating between the axial opening and the flange portions for stiffening the body member with a minimum increase in weight.

9. A wheel and shaft assembly including
   a shaft having first and second portions and wherein the first portion is fixedly supported,
   a wheel having a central axial hub including an axial opening and with the axial opening receiving the second portion of the shaft to have the wheel rotate on the shaft,
   the second portion of the shaft and the axial opening of the wheel including a plurality of mating grooves and ridges each having sloping sides to lock the wheel on the second portion of the shaft and with the mating grooves and ridges having sufficient clearance for allowing the rotation of the wheel on the shaft, and
   the number of mating grooves and ridges in the range between three (3) and eight (8) and the angular relationship between the tangents to the sloping sides and the central axis of rotation is in the range between 20° to 60°.

10. The wheel as shaft assembly of claim 9 wherein the number of grooves and ridges is four (4) or five (5).

11. The wheel and shaft assembly of claim 9 wherein the sloping sides of the grooves and ridges have complementary asymmetric contours for providing clearance to compensate for manufacturing tolerances and demolding and assembly distortion.

12. The wheel and shaft assembly of claim 11 wherein the angular relationship of one sloping side is in the range of 20° to 40° and the angular relationship of the other sloping side is in the range of 30° to 60°.

13. The wheel and shaft assembly of claim 12 wherein the angular relationshp of the one sloping side is approximately 30° and the angular relationship of the other sloping side is approximately 45°.

* * * * *